(12) United States Patent
Lee (10) Patent No.: US 6,759,151 B1
(45) Date of Patent: Jul. 6, 2004

(54) MULTILAYER ARTICLE CHARACTERIZED BY LOW COEFFICIENT OF THERMAL EXPANSION OUTER LAYER

(75) Inventor: Kang N. Lee, Westlake, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/154,526

(22) Filed: May 22, 2002

(51) Int. Cl.[7] ............................. B32B 9/04; F03B 3/12
(52) U.S. Cl. ................. 428/701; 428/446; 428/448; 428/469; 428/697; 428/698; 428/699; 428/702; 416/241 B
(58) Field of Search ................. 428/469, 446, 428/448, 697, 699, 701, 702, 632, 633, 641, 698; 416/241 B (56) References Cited

U.S. PATENT DOCUMENTS

| | | |
|---|---|---|
| 4,095,003 A | 6/1978 | Weatherly et al. |
| 4,183,798 A | 1/1980 | Esper et al. |
| 4,299,865 A | 11/1981 | Clingman et al. |
| 4,882,109 A | 11/1989 | Matsui et al. |
| 5,223,045 A | 6/1993 | Priceman |
| 5,304,519 A | 4/1994 | Jackson et al. |
| 5,391,404 A | 2/1995 | Lee et al. |
| 5,443,686 A | 8/1995 | Jones et al. |
| 5,466,208 A | 11/1995 | Jackson et al. |
| 5,484,263 A | 1/1996 | Nagaraj et al. |
| 5,763,008 A | 6/1998 | Sarin et al. |
| 5,869,146 A | 2/1999 | McCluskey et al. |
| 5,871,820 A | 2/1999 | Hasz et al. |
| 5,894,053 A | 4/1999 | Fried |
| 5,906,895 A | 5/1999 | Hamada et al. |
| 5,985,470 A | 11/1999 | Spitsberg et al. |
| 6,044,830 A | 4/2000 | Jones |
| 6,071,628 A | 6/2000 | Seals et al. |

(List continued on next page.)

FOREIGN PATENT DOCUMENTS

| | | |
|---|---|---|
| EP | 0 304 176 | 7/1988 |
| EP | 0 595 451 B1 | 4/1996 |
| EP | 1 111 085 A1 | 6/2001 |
| EP | 1 142 850 A1 | 10/2001 |
| JP | 11-12050 * | 1/1999 |
| WO | WO 01/63008 A2 | 8/2001 |

OTHER PUBLICATIONS

*Erosion Studies on Duplex and Graded Ceramic Overlay Coatings*, Saifi Usamani et al., Nov. 1996 JOM, pp. 51–55.
*Thermal Barrier Coatings for Heat Engines*, T. Troczynski et al., pp. 451–463.

(List continued on next page.)

Primary Examiner—Jennifer McNeil
(74) Attorney, Agent, or Firm—Kent N. Stone; Paul A. Serbinowski (57) ABSTRACT

A multilayer article comprises a substrate comprising a ceramic or a silicon-containing metal alloy. The ceramic is a Si-containing ceramic or an oxide ceramic with or without silicon. An outer layer overlies the substrate and at least one intermediate layer is located between the outer layer and the substrate. An optional bond layer is disposed between the at least one intermediate layer and the substrate. The at least one intermediate layer may comprise an optional chemical barrier layer adjacent the outer layer, a mullite-containing layer and an optional chemical barrier layer adjacent to the bond layer or substrate. The outer layer comprises a compound having a low coefficient of thermal expansion selected from one of the following systems: rare earth (RE) silicates; at least one of hafnia and hafnia-containing composite oxides; zirconia-containing composite oxides and combinations thereof.

28 Claims, 8 Drawing Sheets

U.S. PATENT DOCUMENTS

| | | | |
|---|---|---|---|
| 6,106,959 A | | 8/2000 | Vance et al. |
| 6,129,954 A | | 10/2000 | Spitsberg et al. |
| 6,159,553 A | | 12/2000 | Li et al. |
| 6,197,424 B1 | * | 3/2001 | Morrison et al. |
| 6,210,791 B1 | * | 4/2001 | Skoog et al. |
| 6,254,935 B1 | | 7/2001 | Eaton et al. |
| 6,258,467 B1 | | 7/2001 | Subramanian |
| 6,296,447 B1 | | 10/2001 | Rigney et al. |
| 6,296,909 B1 | | 10/2001 | Spitsberg et al. |
| 6,299,988 B1 | | 10/2001 | Wang et al. |
| 6,340,500 B1 | | 1/2002 | Spitsberg |
| 6,482,537 B1 | * | 11/2002 | Strangman et al. |
| 6,544,665 B2 | * | 4/2003 | Rigney et al. |

OTHER PUBLICATIONS

1996 Trans Tech Publications, Switzerland.

High Temperature Corrosion Materials Chemistry, *Effects of Impurities and Coating Design on the Durability of EBC for Silicon–Base Ceramics*, Kang N. Lee, Electrochemical Society Proceedings vol. 99–38, pp. 417–428.

*Durability of Mullite/YSZ–Coated SIC in 90 $H_2O/O_2$*. Advances in Ceramic Matrix Composites IV, pp. 17–25. Reprinted from Ceramic Transactions, vol. 96 (1999).

*Ceramic Thermal Barriers for Demanding Turbine Applications*, W. A. Kaysser et al., cfi/Ber, DKG 77 (2000) No. 6, pp. 32–36.

*Degradation of Environmental Barrier Coatings (EBC) Due to Chemical and Thermal Expansion Incompatibilty*, High Temperature Corrosion and Materials Chemistry III, Lee, Electrochemical Soc Proceedings vol. 2001–12, pp. 124–135.

*Modification of Mullite –Based Coatings on Si–Based Ceramics for Enhanced Durability*, Hitemp Review 1997, Advanced High Temperature Engine Materials Technology Program, vol. III: Turbine Materials—CMC's. pp. 1–12.

*Key Durability Issues with Mullite–Based Environmental Barrier Coatings for Si–Based Ceramics*, Kang N. Lee, vol. 122, Oct. 2000, pp. 632–636.

*Concept of Functionally Graded Materials for Advanced Thermal Barrier Coating Applications*, Woo Y. Lee et al., J. Am. Ceramics Society 79 (12) 3003–12 (1996).

*Oxidation and Pore Formation at the Mullite/SIC Interface in Air and Water Vapor, Fundamental Aspects of High Temperature Corrosion*, Proceedings vol. 96–26, pp. 124–139.

*Architecture of Thermal Barrier Coatings Produced by Electron Beam–Physical Vapor Deposition (EB–PVD)*, Jogender Singh, et al., Proceedings from Processing and Fabrication of Advanced Materials IX, Oct. 9–12, 2000.

*Development and environmental durability of mullite and mullite/YSZ dual layer coatings for Sic and $Si_3N_4$ ceramics*. Kang N. Lee, et al., Surface & Coatings Technology 86–87 (1996) pp. 142–148.

*Contamination Effects on Interfacial Porosity during Cyclic Oxidation of Mullite–Coated Silicon Carbide*, Kang N. Lee, pp. 3329–3332, J. Am Ceram Soc 81 (12) 1998.

*Current status of environmental barrier coatings for SI–Based Ceramics*, K.N. Lee, Surface and Coatings Technology 133–134 (2000) 1–7.

*Corrosion–Resistant CVD Mullite Coatings for $Si_3N_4$*, Haynes et al., Ceramic Engineering and Science Proceedings, Jan. 1999.

*Ceramic Oxide–Coated Silicon Carbide for High Temperature Corrosive Enviornments*, Price et al. Materials for Advanced Technology Applications, Sep. 1991.

*Formation of mullite coatings on silicon–based ceramics by chemical vapor deposition*, S.N. Basu et al., International Journal of Refractory Metals & Hard Materials 16 (1998) 343–352.

*Environmental Durability of Mullite Coating/SiC and Mullite–YSZ Coating/SiC Systems*, K.N. Lee et al., Ceramic Engineering & Science Proceedings, Sep.–Oct. 1995, pp. 1036–1045.

High Temperature Ceramic Matrix Composites, Environmental Barrier Coatings for Silicon Based Ceramics K.N. Lee et al., pp. 225–229, date unknown.

*Thermal Conductivity of Ceramic Coating Materials Determined by a Laser Heat Flux Technique*, High Temperature Ceramic Matrix Composites, Zhu et al., pp. 263–267, date unknown.

*EBC Protection of SiC/SiC composites in the Gas Turbine Combustion Environment,*, Eaton et al., date unknown, pp. 1–5.

*X–ray Diffraction Data for Yttrium Silicates*, K. Liddell et al., pp. 17–22, date unkown.

*Paralinear Oxidation of CVD SiC in Water Vapor*, J. AM Ceramic Society, 80 (1) 197–205 (1997).

*Thermal Conductivity and Thermal Gradent Cyclic Behavior of Refractory Silicate Coatings on SIC/SIC Ceramic Matrix Composites*, Zhu et al., Conf. on Advanced Ceramics and Structures, Jan. 21–26, 2001, pp. 1–10.

*Phase Evolution of BSAS in Environmental Barrier Coatings*, Eldridge et al., Cocoa Beach 2001.

*Protective Capacity of CVD Mullite Coatings in a High–Temperature, High–Pressure, Air–$H_20$ Environment*, Haynes et al., Journal of American Ceramic Society, Aug. 5, 1999, pp. 1–14.

*New Generation of Plasma–Sprayed Mullite Coatings on Silicon Carbide*, K.N. Lee et al., J. Am Ceramic Society 78 (3) 705–10 (1995).

*High Temperature Coating Study to Reduce Contact Stress Damage of Ceramics*, Richerson et al., date unknown, pp. 453–461.

*SiC and $Si_3N_4$ recession due to $SiO_2$ Scale volatility under combustor conditions*, Smialek et al., Adv. Composite Mater, vol. 8, No. 1, pp. 33–45 (1999).

*$Y_2SiO_5$ As Oxidation Resistant Coating For C/C Composites*, Y. Ogura, 10th International Conference on Composites, Whistler, BC Canada, date unknown.

* cited by examiner

1000h, 1300°C-1 hr cycles, 90% $H_2O$   100h, 1400°C-1 hr cycles, 90% $H_2O$

Fig. 3b

Fig. 3a 300h, 1400°C-1h cycles, 90 H₂O 100h, 1300°C-1h cycles, 90H₂O

Fig. 4a

Fig. 4b 500h, 1300°C-1h cycles, 90 H₂O 100h, 1400°C-20h cycles, Air

100h, 1300°C-1h cycles, 90H₂O       100h, 1300°C-1h cycles, 90 H₂O

Fig. 7a                              Fig. 7b 300h, 1400°C-1h cycles, 90 $H_2O$

Figure 8

MULTILAYER ARTICLE CHARACTERIZED BY LOW COEFFICIENT OF THERMAL EXPANSION OUTER LAYER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. §2457).

FIELD OF THE INVENTION

The present invention is directed to a multilayer system for protecting components exposed to severe environmental and thermal conditions such as the hostile environment present in gas turbine engines.

BACKGROUND OF THE INVENTION

A major limitation in the efficiency and emission of current gas turbines is the temperature capability (strength and durability) of metallic structural components (blades, nozzles and combustor liners) in the engine hot section. Although ceramic thermal barrier coatings are used to insulate metallic components, thereby allowing the use of higher gas temperatures, the metallic component remains a weak link. Such components must allow for the possibility of coating loss from spallation or erosion.

Silicon-containing ceramics are ideal materials for high temperature structural applications such as heat exchangers, advanced gas turbine engines, and advanced internal combustion engines. They have excellent oxidation resistance in clean oxidizing environments due to the formation of a slow-growing silica ($SiO_2$) scale. Reduced durability in high temperature environments containing molten salts, water vapor or a reducing atmosphere can limit their effectiveness. Molten salts react with silica scale to form liquid silicates. Oxygen readily diffuses through liquid silicates and rapidly oxidizes the substrate. High water vapor levels lead to hydrated silica species ($Si(OH)x$) and subsequent evaporation of protective scale. Complex combustion atmospheres containing oxidizing and reducing gases form $SiO_2$ and then reduce it to $SiO(g)$. In situations with low partial pressure of oxidant, direct formation of $SiO(g)$ occurs. All of these reactions can potentially limit the formation of a protective silica scale and lead to accelerated or catastrophic degradation.

Examples of silicon-containing ceramics are SiC fiber-reinforced SiC ceramic matrix composites (SiC/SiC CMCs), SiC fiber-reinforced $Si_3N_4$ matrix composites (SiC/$Si_3N_4$ CMCs), carbon fiber reinforced SiC ceramic matrix composites (C/SiC CMCs), and monolithic silicon carbide or silicon nitride. A primary problem Si-containing ceramics face is rapid recession in combustion environments due to the volatilization of silica scale via reaction with water vapor, a major product of combustion. Therefore, use of silicon-containing ceramic components in the hot section of advanced gas turbine engines requires development of a reliable method to protect the ceramic from environmental attack. One approach in overcoming these potential environmental limitations is to apply a barrier coating which is environmentally stable in molten salts, water vapor and/or reducing atmosphere.

An early environmental barrier coating system (EBC) consisted of two layers, a mullite ($3Al_2O_3.2SiO_2$) coat and a yttria-stabilized zirconia (YSZ) top coat. The mullite coat provided bonding, while the YSZ top coat provided protection from water vapor. Mullite has a good coefficient of thermal expansion match and chemical compatibility with Si-based ceramics. However, the relatively high silica activity of mullite and the resulting selective volatilization of silica cause its rapid recession in water vapor. This EBC provided protection from water vapor for a few hundred hours at 1300° C. During longer exposures, however, water vapor penetrated through cracks in the mullite and attacked the Si-containing substrate, leading to coating delamination.

Another EBC with improved performance was developed as part of a NASA High Speed Research-Enabling Propulsion Materials (HSR-EPM) Program in joint research by NASA, GE, and Pratt and Whitney. The EBC consisted of three layers: a silicon bond coat, an intermediate coat consisting of mullite or mullite and barium strontium aluminosilicate (BSAS), and a BSAS top coat. The mullite, mullite and BSAS, and BSAS layers were applied by a modified plasma spray process developed at the NASA Glenn Research Center as disclosed in U.S. Pat. No. 5,391,404, which is incorporated by reference herein in its entirety. The EBC was applied to SiC/SiC CMC combustor liners used in three Solar Turbine Centaur 50s gas turbine engines. The combined operation of the three engines resulted in the accumulation of tens of thousands of hours without failure at a maximum combustor liner temperature of about 1250° C. A drawback of this BSAS-top coat EBC is that when applied to the solar turbine SiC/SiC liners it suffered from substantial BSAS recession after engine testing.

Protective layers for Si-containing ceramic substrates, and for other substrate materials which may also be subject to degradation under the harsh hot section engine component type of environment, including silicon/metal alloys and oxide ceramics, are needed which improve upon the performance of current systems by having a longer life or capability to withstand higher operating temperatures without failure.

SUMMARY OF THE INVENTION

The present invention is directed to a multilayer article which includes a substrate comprising a compound selected from the group consisting of a ceramic compound, a Si-containing metal alloy and combinations thereof. In particular, the ceramic compound may be a Si-containing ceramic or an oxide ceramic with or without Si. One preferred oxide ceramic is a mullite ($3Al_2O_3 2SiO_2$)-containing ceramic. The multilayer article also includes an outer layer and at least one intermediate layer located between the outer layer and the substrate. The outer layer comprises one of the following compounds having a low coefficient of thermal expansion: rare earth (RE) silicates; at lease one of a) hafnia ($HfO_2$) and b) hafnia ($HfO_2$)-containing composite oxides; and zirconia ($ZrO_2$)-containing composite oxides. Components of gas turbine engines, internal combustion engines and heat exchangers may be comprised of the multilayer article of the present invention.

Although the outer layer may be referred to as a top coat, it need not be a coating per se. Also, other layers may be placed on top of the outer layer (i.e., further from the substrate than the outer layer). It should be understood that terms such as upper, lower, top, bottom and the like are used in this disclosure for purposes of illustration and should not be used to limit the invention, since these relative terms depend upon the orientation of the substrate. The intermediate layer is typically a layer that is applied to the substrate or to a layer(s) on the article. However, some substrate materials, such as mullite-containing materials, inherently form an intermediate layer (e.g., mullite). Whether applied or inherent, both constitute intermediate layers as these terms are used in this disclosure. Also, the term composite oxide used herein means a compound or a mixture containing at least two oxides.

In one embodiment of the invention the outer layer comprises a low CTE rare earth silicate having a formula selected from the group consisting of (1) $RE_2O_3.SiO_2$, (2) $2RE_2O_3.3SiO_2$, (3) $RE_2O_3.2SiO_2$ and combinations thereof. RE is a rare earth element selected from the group consisting of Sc, Dy, Ho, Er, Tm, Yb, Lu, Eu, Gd, Tb and combinations thereof. Exemplary rare earth oxides are $Sc_2SiO_5$, $Er_2SiO_5$, $Yb_2SiO_5$ and combinations thereof. One preferred rare earth silicate has the formula $RE_2O_3.SiO_2$, characterized by a low CTE X2 phase, where RE is Sc, Dy, Ho, Er, Tm, Yb, Lu and combinations thereof Another preferred rare earth silicate has the formula $RE_2O_3.SiO_2$, characterized by a low CTE X1 phase, where RE is Eu, Gd, Tb and combinations thereof. The rare earth silicate-containing outer layer is not used on a C/C ceramic substrate (carbon fiber-reinforced carbon matrix composite). A preferable substrate on which the rare earth silicate outer layer is used comprises a Si-containing ceramic compound.

In a second embodiment of the invention the outer layer comprises at least one of a) hafnia and b) a hafnia-containing composite oxide comprising hafnia and a compound selected from the group consisting of mullite, barium strontium aluminosilicate, calcium aluminosilicate, magnesium aluminosilicate, rare earth silicate, alumina, tantalum oxide, niobium oxide, silica, titania and combinations thereof. In particular, the hafnia-containing composite oxide comprises a compound selected from the group consisting of $HfO_2.SiO_2$, $HfO_2.TiO_2$, $xHfO_2.Ta_2O_5$ (where $5 \leq x \leq 7$, x being preferably 6), and combinations thereof In another aspect of the invention, the outer layer comprises a mixture of $HfO_2$ and an oxide selected from the group consisting of mullite, barium strontium aluminosilicate, calcium aluminosilicate, magnesium aluminosilicate, rare earth silicate, $Al_2O_3$, $Ta_2O_5$, $Nb_2O_5$ and combinations thereof.

In a third embodiment of the invention the outer layer comprises a zirconia-containing composite oxide comprising zirconia and a compound selected from the group consisting of silica, titania, tantalum oxide and combinations thereof In particular, the zirconia-containing composite oxide comprises a compound selected from the group consisting of $ZrO_2.SiO_2$, $ZrO_2.TiO_2$, $xZrO_2.Ta_2O_5$, where $5 \leq x \leq 7$, x being preferably 6, and combinations thereof. This outer layer is preferably used on a substrate which is susceptible to recession resulting from volatilization upon exposure to water vapor. A preferred substrate on which the zirconia-composite oxide outer layer is used comprises a Si-containing ceramic compound.

The intermediate layer can comprise a single layer or multiple layers and is defined herein as being located between the outer layer and a bond layer on the substrate or, if no bond layer is used, between the outer layer and the substrate. A mullite-containing intermediate layer comprises a compound selected from one of (1) mullite ($3Al_2O_3.2SiO_2$) and (2) mullite and a compound selected from the group consisting of barium strontium aluminosilicate or BSAS (x $BaO.(1-x)$ $SrO.Al_2O_3.2SiO_2$) where $0 \leq x \leq 1$, calcium aluminosilicate or CAS ($CaO.Al_2O_3.2SiO_2$), magnesium aluminosilicate or MAS ($2MgO.2Al_2O_3.5SiO_2$) and combinations thereof. An especially suitable intermediate layer used in combination with any of the outer layers comprises mullite and BSAS.

The intermediate layer may include a chemical barrier layer comprising a compound selected from the group consisting of mullite, hafnia ($HfO_2$), hafnia silicate (e.g., $HfSiO_4$), rare earth silicate (e.g., $RE_2SiO_5$ where RE is Sc or Yb), and combinations thereof. The chemical barrier layer is preferably located between an intermediate layer and the outer layer, more particularly, is in contact with the outer layer and even more particularly is between and contiguous with the outer layer and the mullite-containing layer. Another mullite chemical barrier layer may be disposed adjacent to the bond layer or substrate.

A silicon-containing bond coat comprised, for example, of silicon (Si) or silicides, such as molybdenum-silicon alloys and niobium-silicon alloys, can be disposed in contact with the substrate.

The substrate comprises one of the following compounds: a Si-containing ceramic, such as silicon carbide (SiC), silicon nitride ($Si_3N_4$), composites having a SiC or $Si_3N_4$ matrix, silicon oxynitride, and silicon aluminum oxynitride; a Si-containing metal alloy, such as molybdenum-silicon alloys (e.g., $MoSi_2$) and niobium-silicon alloys (e.g., $NbSi_2$); and an oxide ceramic such as mullite-containing ceramics (e.g., a mullite matrix with ceramic fibers, such as alumina fibers, dispersed in the matrix). The substrate may comprise a matrix reinforced with ceramic fibers, whiskers, platelets, and chopped or continuous fibers.

Other features, details and advantages of the invention will be apparent from the attached drawings and detailed description that follows.

DETAILED DESCRIPTION

The present invention is directed to a multilayer article which can resist a harsh high temperature, water vapor environment. The inventive articles are especially suited as hot section structural components of heat engines and heat exchanger tubes for industrial furnaces. When uncoated, the substrates suffer from rapid recession in heat engine environments due to the volatilization of silica by water vapor. The inventive multilayer articles resist degradation in various environments, but particularly in high temperature, water vapor-containing combustion environments, by being tailored to possess water vapor resistance, coefficient of thermal expansion match with the substrate, phase stability and chemical compatibility among the layers and substrate.

Figure 1:
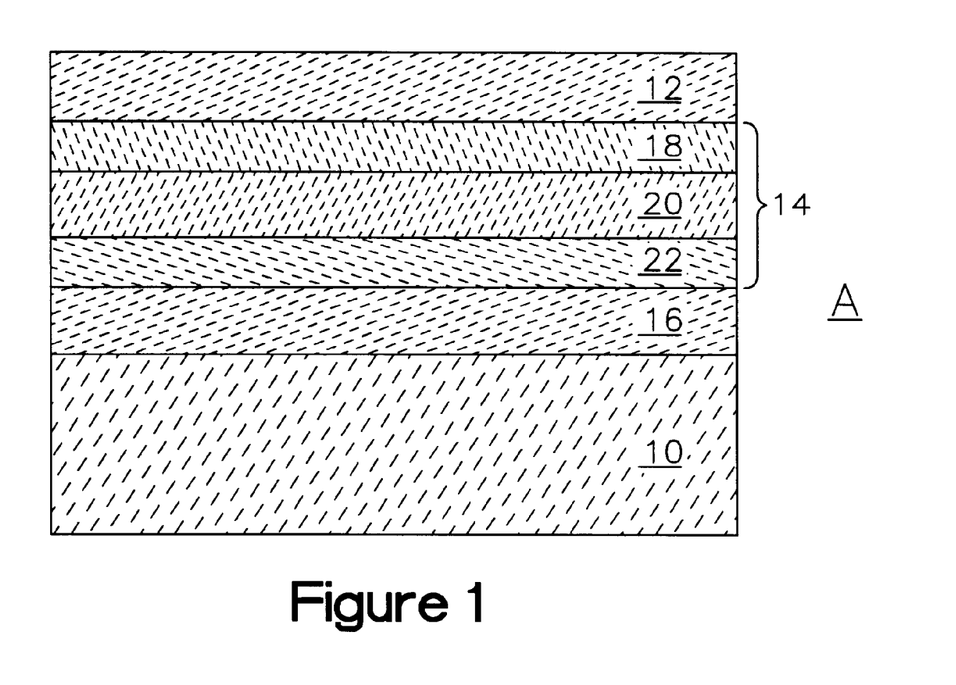
FIG. 1 is a cross-sectional view of a multilayer article of the present invention, it being understood that the geometry of the article may vary according to the shape of the component it comprises such as components of heat exchangers, gas turbine engines and internal combustion engines.

Referring to FIG. 1, the inventive multilayer article A comprises a substrate 10 comprising a ceramic or a silicon-containing metal alloy. The ceramic is a Si-containing ceramic or an oxide ceramic with or without silicon. In particular, a suitable oxide ceramic substrate material is a mullite-containing material, such as alumina fiber reinforced mullite matrix composites. An outer layer 12 overlies the substrate and at least one intermediate layer 14 is located between the outer layer and the substrate. An optional bond layer 16 is disposed between the at least one intermediate layer 14 and the substrate 10. The at least one intermediate layer 14 comprises an optional chemical barrier layer 18 (selected from the group consisting of mullite, rare earth silicate (e.g., $RE_2SiO_5$ where RE is Sc or Yb), $HfO_2$, $HfSiO_4$ and combinations thereof), a mullite-containing layer 20 and an optional mullite chemical barrier layer 22. The intermediate layers 14 may comprise the mullite-containing layer 20 plus optional chemical barrier layers 18 and 22.

The outer layer comprises a compound having a low coefficient of thermal expansion selected from one of the following systems: rare earth (RE) silicates; at least one of hafnia and hafnia-containing composite oxides; zirconia-containing composite oxides and combinations thereof. As used in this disclosure, the terms low coefficient of thermal expansion mean having a coefficient of thermal expansion less than $8 \times 10^{-6}/°$ C. and, preferably about $6 \times 10^{-6}/°$ C. or less.

Although each layer of the inventive coating system may have various functions, a principal function of the multilayer system is to protect substrates which are susceptible to recession resulting from volatilization upon exposure to water vapor. This is especially true of Si-containing materials, which are the preferred substrate materials of the inventive articles. The inventive system provides an environmental barrier which inhibits formation of gaseous species of Si, particularly Si(OH)x, when the substrate is exposed to a high temperature environment containing water vapor. Any combinations (mechanical or chemical mixtures, multiple layers or compositional grading) of the above outer layer may be used. By compositional grading is meant combining two or more materials in successive layers using increasing amounts of one component and decreasing amounts of another to match the coefficient of thermal expansion between materials, such as between the top coat and substrate or between an intermediate layer and outer layer. A purpose of the low CTE oxide outer layer materials is to provide environmental protection, in particular from water vapor, and thermal protection by generating a temperature gradient due to their low thermal conductivity. Although the multiple layers used in the present invention may be referred to as an environmental barrier coating (EBC), the term EBC should not be used to limit the present invention. Each of the layers on the substrate may have at least chemical resistant and/or temperature resistant functions.

The inventive multilayer system includes two types of optional bond layers and at least one intermediate layer to improve bonding of the low CTE outer layer to the substrate. A silicon bond layer (e.g., bond coat) is preferred when the temperature at the bond layer is below the melting point of silicon. Alternatively, a bond layer which comprises a silicon-containing metal alloy having a melting point above the melting point of silicon may be used, such as Mo—Si alloy and Nb—Si alloy. Suitable bond layer compositions would be apparent to those skilled in the art in view of this disclosure.

The intermediate layer 20 is a mullite-containing layer comprising one of (1) mullite and (2) mullite and alkaline earth metal aluminosilicate. The alkaline earth metal aluminosilicate is preferably BSAS ($xBaO.(1-x)SrO.Al_2O_3.2SiO_2$) where $0 \leq x \leq 1$, calcium aluminosilicate or CAS ($CaO.Al_2O_3.2SiO_2$), or magnesium aluminosilicate or MAS ($2MgO.2Al_2O_3.5SiO_2$). The intermediate layer 20 is preferably comprised of mullite and BSAS due to its excellent crack resistance. This results in better durability compared to EBCs having a mullite intermediate layer. The mullite and glass ceramic (e.g., BSAS, CAS, or MAS) tend to form low melting glasses at relatively high temperatures (above about 1300° C.). Mullite alone can be used as an intermediate layer to eliminate glass formation, especially in higher temperature applications.

At least one of the multilayers is an optional chemical barrier layer. Reference to chemical barrier layer should not be used to limit the present invention as it is intended to characterize a predominant feature of this layer, not to exclude other features such as thermal resistance. Some outer layer materials can react with the mullite and glass ceramic intermediate layer 20 at high temperatures, forming low melting reaction products. A low melting reaction product should be avoided since it not only reduces the life of the article but also increases thermal conductivity of the layers. Therefore, the chemical barrier layer 18 can be applied between the mullite and glass ceramic intermediate layer 20 and the low CTE oxide outer layer 12 if the mullite and glass ceramic intermediate layer chemical reaction produces a low melting product. Suitable chemical barrier compounds 18 include mullite, $HfO_2$, $HfSiO_4$, and a rare earth silicate (e.g., $RE_2SiO_5$ where RE is Sc or Yb).

Another option is to apply a mullite chemical barrier layer 22 between the mullite-and-glass ceramic intermediate layer 20 and the silicon bond layer 16 (or silicon-containing substrate 10 when no bond layer is used) to prevent detrimental glass ceramic-silica reaction.

Rare Earth Silicate-Containing Outer Layer

Turning now to a discussion of the low CTE oxide outer layer compounds (e.g., top coats) of the present invention, in one embodiment of the invention the low CTE oxide outer layer 12 comprises low CTE rare earth silicate having a formula selected from the group consisting of (1) $RE_2O_3.SiO_2$, (2) $2RE_2O_3.3SiO_2$, (3) $RE_2O_3.2SiO_2$ and combinations thereof. RE is a rare earth element selected from the group consisting of Sc, Dy, Ho, Er, Tm, Yb, Lu, Eu, Gd, Tb and combinations thereof Exemplary rare earth oxides are $Sc_2SiO_5$, $Er_2SiO_5$, $Yb_2SiO_5$ and combinations thereof One preferred rare earth silicate has the formula $RE_2O_3.SiO_2$, characterized by a low CTE X2 phase, where RE is selected from the group consisting of Sc, Dy, Ho, Er, Tm, Yb, Lu and combinations thereof Another preferred rare earth silicate has the formula $RE_2O_3.SiO_2$, characterized by a low CTE X1 phase, where RE is selected from the group consisting of Eu, Gd, Tb and combinations thereof The rare earth silicate-containing outer layer is not used on a C/C ceramic substrate (carbon fiber-reinforced carbon matrix composite). A preferable substrate on which the rare earth silicate outer layer is used comprises a Si-containing ceramic compound.

Silicates of one group of rare earth elements ($RE_2O_3.SiO_2$ where RE is La, Ce, Pr, Nd, Pm Sm) are undesirable in that they are present in the high CTE X1 phase. For example, the CTE of $Sm_2SiO_5$ is about $9\times10^{-6}/°$ C. (Y. Ogura et al., "$Y_2SiO_5$ as Oxidation Resistant Coating for C/C Composites," Proc. 10th International Conf. on Composite Materials, 767–774, Whistler, Canada, 1995). Silicates having rare earth elements with a greater ionic radius than Sm (Pm, Nd, Pr, Ce and La) are undesirable in that they are believed to have a CTE greater than that of $Sm_2SiO_5$ because CTE increases with increasing ionic radius. The rare earth silicate, $Y_2SiO_5$, is undesirable in that it undergoes a polymorphic phase transformation from the low temperature (X1) phase to high temperature (X2) phase under thermal cycling. This transformation is accompanied by a volume change, which leads to cracking when applied as a coating.

The rare earth silicates $RE_2O_3.SiO_2$ of the present invention in which RE is Sc, Dy, Ho, Er, Tm, Yb, Lu, Eu, Gd, Tb maintain the low CTE phase at all temperatures. For a discussion and definition of the X1 and X2 phases, refer to the article, Liddell, K. and Thompson, P., "X-Ray Diffraction Data for Yttrium Silicates," Br. Ceram. Trans. J. 85, 17–22 (1986), which is incorporated herein by reference in its entirety. The CTE of rare earth silicates is proportional to the ionic radius of rare earth elements. Thus, the $RE_2O_3.SiO_2$ silicates are believed to have a CTE in the range between about $4\times10^{-6}/°$ C. and $8\times10^{-6}/°$ C. The phase stability and low CTE make the $RE_2O_3.SiO_2$ rare earth silicate of the present invention a suitable compound for EBCs employing silicon-containing ceramics such as those comprising SiC, $Si_3N_4$, Mo—Si alloys, Nb—Si alloys, and combinations thereof.

The other rare earth silicates of the present invention, $2RE_2O_3.3SiO_2$ and $RE_2O_3.2SiO_2$, are also suitable EBC compounds. These silicates are advantageous in that they have chemical and/or physical properties similar to that of the $RE_2O_3.SiO_2$ rare earth silicate, except for a slightly lower melting point.

Hafnia and Hafnia-Containing Composite Oxide Outer Layer

In the second embodiment of the invention the low CTE outer layer comprises at least one of a) hafnia and b) a hafnia-containing oxide selected from the group consisting of $HfO_2.SiO_2$ ($HfSiO_4$), $HfO_2.TiO_2$ ($HfiO_4$), $xHfU_2.Ta_2O_5$, where $5 \leq x \leq 7$, x being preferably 6, and combinations thereof. Hafnia and the hafnia compounds are suitable outer layer compounds because hafnia has a low CTE and phase stability. Hafnia has a thermal expansion of about $6\times10-6/°$ C. and a phase stability up to 1650° C. (3000° F.). The hafnia-containing oxides are also suitable outer layers due to the high melting point of hafnia (about 2758° C.).

In another aspect of the invention the composite oxide comprises hafnia and a component selected from the group consisting of mullite, BSAS, CAS, MAS, rare earth silicate, $Al_2O_3$, $Ta_2O_5$, $Nb_2O_5$ and combinations thereof. This takes advantage of the high melting, low CTE behavior of hafnia in admixture with the other low CTE oxides. The hafnia-low CTE oxide mixture is expected to possess the benefits of lower thermal conductivity due to phonon scattering at the phase boundary and toughening due to composite effects (one key mechanism of which is that cracks in composites are deflected or stopped at the boundary between the two materials). An additional benefit is improved strain tolerance due to the improved compliance with the addition of a low modulus second phase oxide such as glass ceramics (alkaline earth metal aluminosilicates: BSAS, CAS, a MAS).

Zirconia-Containing Composite Oxide Outer Layer

In the third embodiment of the invention the low CTE oxide outer layer comprises a zirconia-containing composite oxide selected from the group consisting of $ZrO_2.SiO_2$ ($ZrSiO_4$), $ZrO_2.TiO_2$ ($ZrTiO_4$), $xZrO_2.Ta_2O_5$, where $5 \leq x \leq 7$, x being preferably 6, and combinations thereof The inventive zirconia-containing compounds are suitable outer layer materials since they possess a high melting point (the melting point of zirconia being about 2715° C.) and low CTE.

EXPERIMENTAL PROCEDURE

The following experimental procedure was used to prepare and evaluate the performance of the samples discussed in the following examples.

The EBCs were applied by plasma spraying onto sintered, monolithic SiC (Hexaloy™, Carborundum, Niagara Falls, N.Y.) and melt infiltrated (MI) SiC/SiC composites (GE Power Systems Composites, Newark, N.J.) by atmospheric pressure plasma spraying as generally described in the U.S. Pat. No. 5,391,404 patent. The specific plasma spray conditions are shown in the following Table I.

TABLE I

| Plasma spray conditions | |
|---|---|
| Powder particle size | −62/+20 μm |
| Gun power | 40 kw |
| Plasma Gas | 14.4 SLPM* Ar, 9.6 SLPM He |
| Carrier Gas | 2–6 SLPM Ar |
| Powder feed rate | 15 gm/min |
| Standoff | 15 cm |
| Traverse speed | 30 cm/sec |

*Standard liters per minute

Only one face of the test coupons (2.5 cm×0.6 cm×0.15 cm) was coated. Silicon powder was obtained from Atlantic Equipment Engineers, mullite was obtained from Cerac, Inc., BSAS was obtained from H.C. Starck Inc, and the other powders were specially processed at Praxair Specialty Ceramics. We prepared the powder mixtures simply by mixing the constituent powders.

The thickness of the bond coat ranged from 0.4 to 10 mils. The thickness of each intermediate layer ranged from 0.4to 20 mils. The thickness of the top coat ranged from 0.4 to 20 mils.

The test conditions are shown in the following Table II. Tests were conducted in air and steam (90% $H_2O$-balance $O_2$). The steam environment was generated by pumping water into a cyclic rig using a peristaltic pump. The cyclic rig consists of a high purity alumina tube (99.8% purity) and a vertical tube cycling furnace. The pumped water was rapidly vaporized by passing through quartz wool at T>300° C. in flowing oxygen. The progress of degradation was determined by visual observation and cross-sectional examination using scanning electron microscopy (SEM). Phases were determined by X-ray diffraction.

TABLE II

| | Test Conditions | | | | |
|---|---|---|---|---|---|
| Test Type | Temperature (° C.) | Cycle Frequency (h) | Total Pressure (atm) | $pH_2O$ (atm) | Gas Velocity (cm/sec) |
| Air Furnace | 1400–1500 | 20 or isothermal | 1 | ambient air | stagnant |
| $H_2O$ Furnace | 1300–1400 | 1 or 2 | 1 | 0.9 | 2.2 |

Multilayer articles of the present invention prepared and evaluated by this experimental procedure are described in the following examples which are provided for the purpose of illustration and are not intended to limit the claimed invention as defined by the appended claims.

EXAMPLE 1

Figure 2:
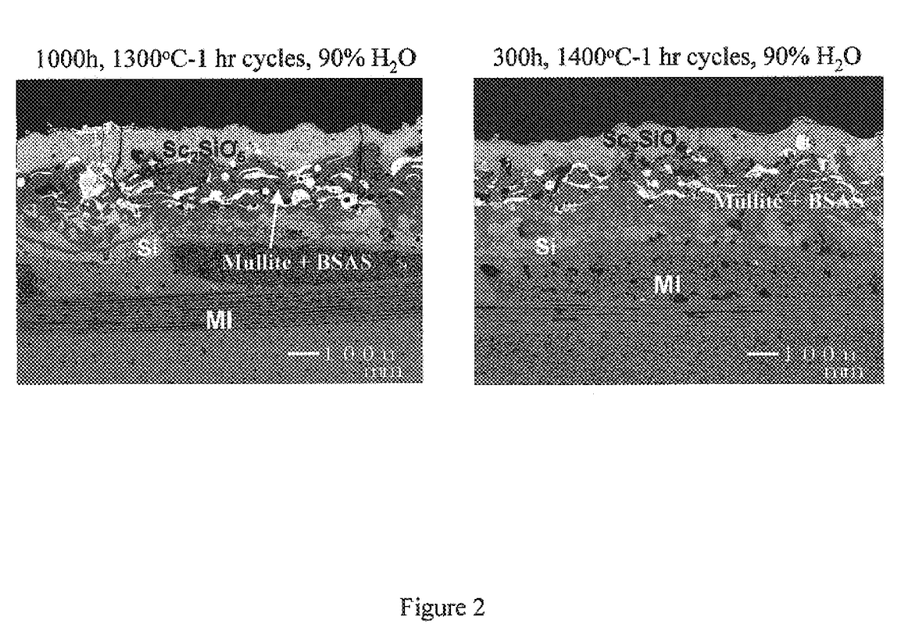
FIG. 2 are SEM micrographs showing the cross-section of an inventive multilayer article comprising a silicon bond coat, a mullite and BSAS intermediate coat and a $Sc_2SiO_5$ top coat.

FIG. 2 compares the cross-section of a multilayer article comprising a silicon bond coat 16, a mullite and BSAS intermediate coat 20 and a $Sc_2SiO_5$ top coat 12 (the reference numbers of the examples being shown in FIG. 1) after heating for 1000 hours at 1300° C., with heating for 300 hours at 1400° C. (1 hour cycles at 90% $H_2O$-balanced $O_2$). The EBC showed excellent durability at both temperatures, maintaining suitable adherence and minimal oxidation.

EXAMPLE 2

Figure 3A:
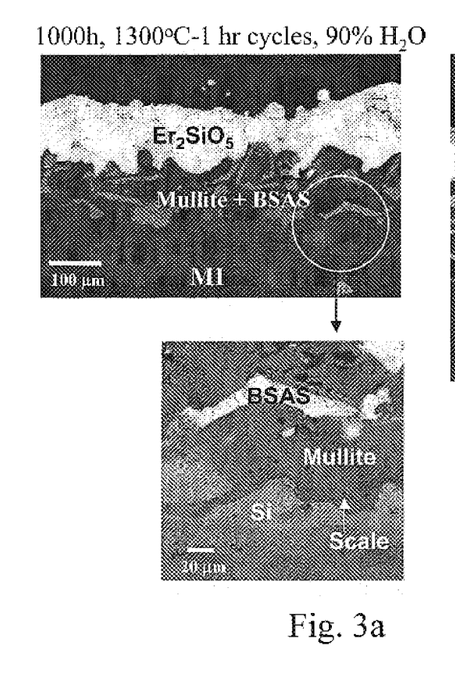
FIGS. 3a and 3b are SEM micrographs showing the cross-section of an inventive multilayer article comprising a silicon bond coat, a mullite and BSAS intermediate coat and an $Er_2SiO_5$ top coat under different heating conditions.
Figure 3B:
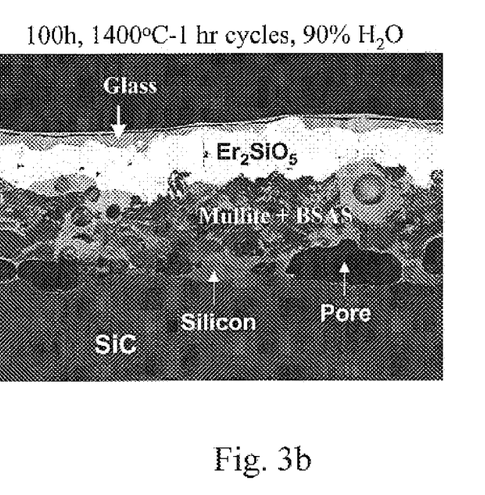

FIGS. 3a and 3b compare the cross-section of multilayer articles comprising a silicon bond coat 16, a mullite and BSAS intermediate coat 20 and an $Er_2SiO_5$ top coat 12 after heating for 1000 hours at 1300° C., with heating for 100 hours at 1400° C. (1 hour cycles at 90% $H_2O$-balanced $O_2$). The inventive multilayer article showed excellent durability at 1300° C. (FIG. 3a), maintaining suitable adherence and minimal oxidation. Massive glasses and pores were observed at 1400° C. (FIG. 3b) which, while not wanting to be bound by theory, are believed to be due to the $Er_2SiO_5$/mullite and BSAS reaction. According to the $Y_2O_3$—$Al_2O_3$—$SiO_2$ phase diagram (Phase Equilibria Diagrams, CD-ROM Database Version 2.1, The American Ceramic Society (1998)), the ternary system is capable of forming products having a melting point as low as about 1400° C. The presence of BaO and SrO will further reduce the melting point of reaction products in the ternary system.

Considering that Er is in the same group as Y, similar reactions are expected to occur in the $Er_2O_3$—$Al_2O_3$—$SiO_2$ system. The molten reaction product moved to the $Er_2SiO_5$ surface. Therefore, the silicon/mullite and BSAS/$Er_2SiO_5$ coated article would use a chemical barrier layer between the mullite-and-BSAS intermediate layer 20 and $Er_2SiO_5$ top coat 12 to prevent the chemical reaction in higher temperature applications. $Sc_2SiO_5$, $Yb_2SiO_5$, $HfO_2$, and $HfSiO_4$, are suitable chemical barrier layers because of their chemical compatibility with $Er_2SiO_5$ as well as with mullite and BSAS.

Among the three silicates, $Sc_2SiO_5$, $Er_2SiO_5$ and $Yb_2SiO_5$, the EBC comprising a $Sc_2SiO_5$ top coat 12 and a mullite and BSAS intermediate coat 20 exhibited the best chemical stability without the formation of a molten product at temperatures up to 1482° C. (2700° F.), while the EBC comprising a $Yb_2SiO_5$ top coat 12 and a mullite and BSAS intermediate coat 20 showed intermediate stability, forming a glass product at about 1440° C.

The silicates with higher $SiO_2$ content ($2RE_2O_3.3SiO_2$, and $RE_2O_3.2SiO_2$) are believed to be suitable outer layer materials because their physical and chemical properties are similar to that of $RE_2O_3.SiO_2$, except for their lower melting point.

EXAMPLE 3

Figure 4A:
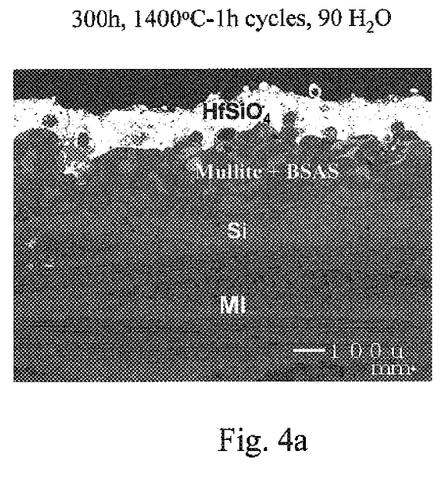
FIGS. 4a and 4b are SEM micrographs showing the cross-sections of inventive multilayer articles, one (FIG. 4a) comprising a silicon bond coat, a mullite and BSAS intermediate coat and an $HfSiO_4$ top coat and the other (FIG. 4b) comprising a silicon bond coat, a mullite and BSAS intermediate coat and an $6HfO_2.Ta_2O_5$ top coat.
Figure 4B:
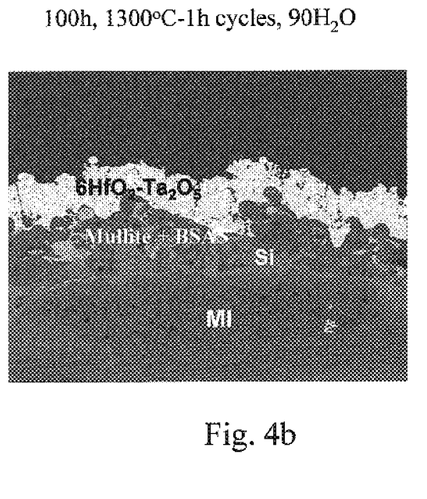

Hafnia is advantageous due to a low (about $6 \times 10^{-6}$/° C.) thermal expansion and phase stability up to 1650° C. (3000° F.). FIG. 4a shows the cross-section of a multilayer article comprising a silicon bond coat 16, a mullite and BSAS intermediate coat 20 and an $HfSiO_4$ top coat 12 after heating for 300 hours at 1400° C. FIG. 4b shows the cross-section of a multilayer article comprising a silicon bond coat 16, a mullite and BSAS intermediate coat 20 and an $6HfO_2.Ta_2O_5$ top coat 12 after heating for 100 hours at 1300° C. (1 hour cycles at 90% $H_2O$-balanced $O_2$) Both EBCs showed suitable durability, maintaining excellent adherence and minimal oxidation.

EXAMPLE 4

Figure 5:
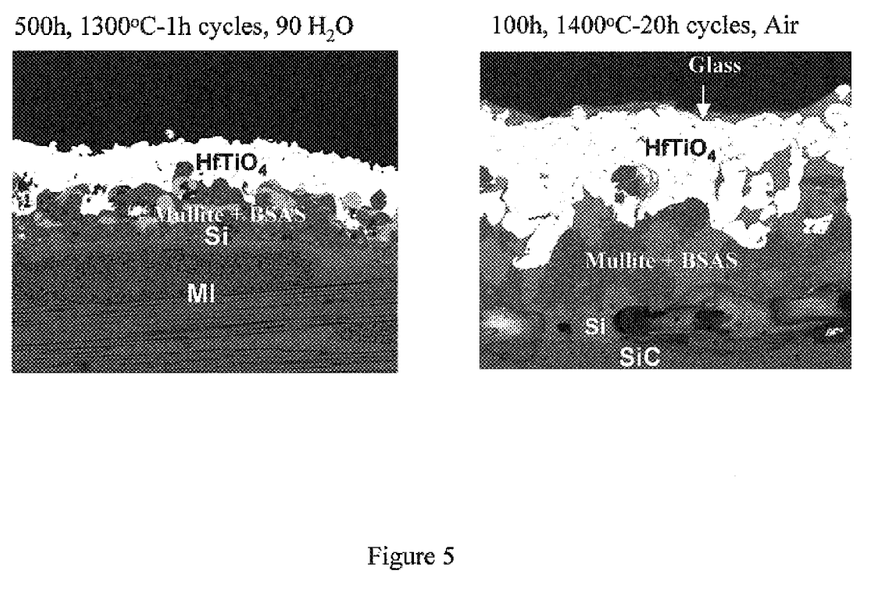
FIG. 5 are SEM micrographs comparing the cross-section of an inventive multilayer article comprising a silicon bond coat, a mullite and BSAS intermediate coat and an $HfTiO_4$ top coat under different heating conditions.

FIG. 5 compares the cross-section of a multilayer article comprising a silicon bond coat 16, a mullite and BSAS intermediate coat 20 and an $HfTiO_4$ top coat 12 heated for 500 h at 1300° C. with heating for 100 hours at 1400° C. (1 hour cycles at 90% $H_2O$-balance O2). The multilayer article showed good durability at 1300° C., maintaining suitable adherence and minimal oxidation. Massive glasses and pores were observed at 1400° C. which, while not wanting to be bound by theory, are believed to be due to the $HTfTiO_4$/mullite+BSAS reaction. This behavior is very similar to that of the silicon/mullite and BSAS/$Er_2SiO_5$ coated article.

The ternary $TiO_2$—$SiO_2$—BaO system can form low melting compounds, such as $BaTiSi_2O_7$ (mp about 1250° C.) and $BaTiSiO_5$ (mp about 1400° C.). The formation of glasses and pores is attributed to low melting silicates. Therefore, the EBC comprising the silicon bond coat 16, the mullite and BSAS intermediate coat 20 and the $HfriO_4$ top coat 12 would use a chemical barrier between the mullite and BSAS intermediate layer 20 and the $HfiO_4$ top coat 12 to prevent the chemical reaction in higher temperature applications. Mullite, $Sc_2SiO_5$, $Yb_2SiO_5$, $HfO_2$, and $HfSiO_4$ are suitable chemical barrier materials because of their chemical compatibility with $HfTiO_4$ as well as with mullite and BSAS.

EXAMPLES 5

Figure 6:
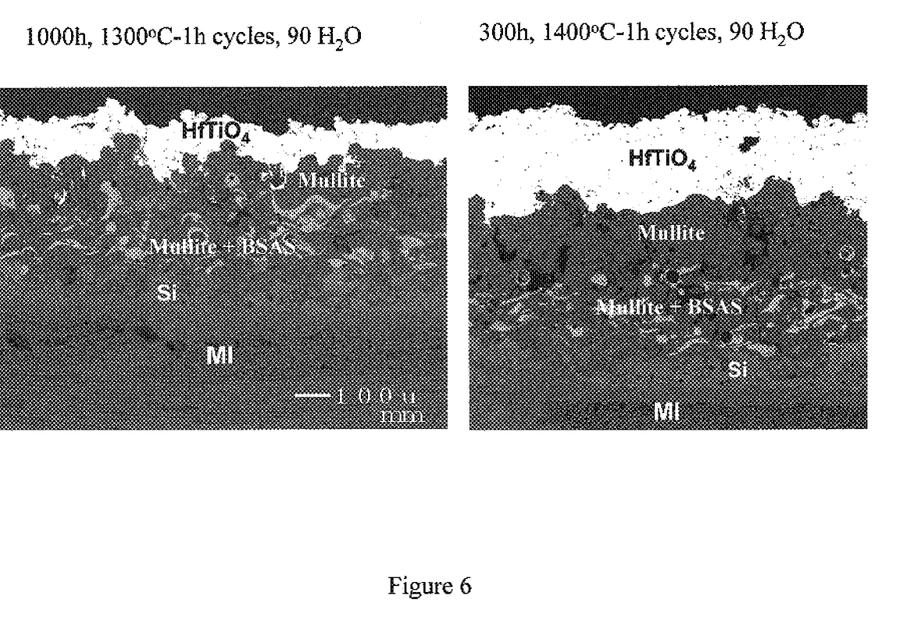
FIG. 6 are SEM micrographs comparing the cross-section of an inventive article comprising a silicon bond coat, a mullite and BSAS intermediate coat, a mullite chemical barrier layer and an $HfFiO_4$ top coat under different heating conditions.

FIG. 6 compares the cross-section of a multilayer article comprising a silicon bond coat 16, a mullite and BSAS intermediate coat 20, a mullite chemical barrier layer 18 and an $HffTiO_4$ top coat 12 heated for 1000 hours at 1300° C., with heating for 300 hours at 1400° C. (1 hour cycles at 90% $H_2O$-balance $O_2$). Note the improved durability at 1400° C. with the addition of a mullite chemical barrier layer, without forming glasses or pores. This demonstrates the usefulness of a chemical barrier layer between layers in the inventive multilayered article to prevent detrimental chemical reactions.

EXAMPLE 6

Figure 7A:
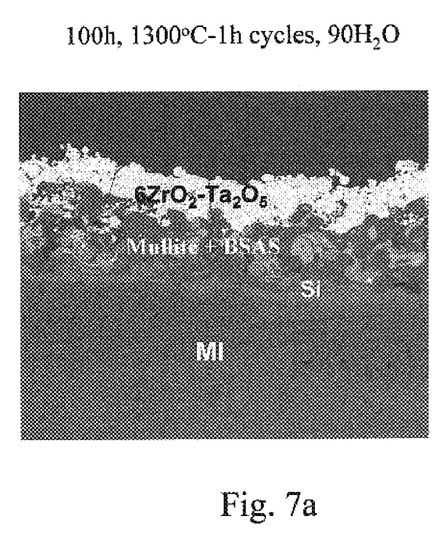
FIGS. 7a and 7b are SEM micrographs showing the cross-sections of two inventive multilayer articles, one (FIG. 7a) comprising a silicon bond coat, a mullite and BSAS intermediate coat and a $6ZrO_2.Ta_2O_5$ top coat and the other (FIG. 7b) comprising a silicon bond coat, a mullite and BSAS intermediate coat and a $ZrTiO_4$ top coat.
Figure 7B:
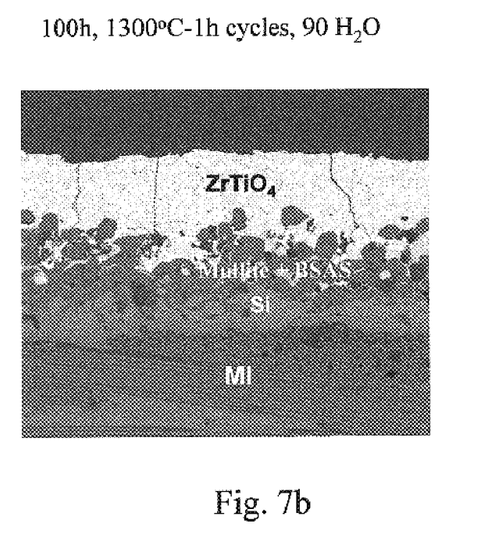

FIG. 7 shows the cross-section of two inventive multilayer articles, one (FIG. 7a) comprising a silicon bond coat 16, a mullite and BSAS intermediate coat 20 and a $6ZrO_2.Ta_2O_5$ top coat 12. The other (FIG. 7b) comprises a silicon bond coat 16, a mullite and BSAS intermediate coat 20 and a $ZrTiO_4$ top coat 12. Both were heated for 100 hours at 1300° C. (1 hour cycles at 90% $H_2O$-balance $O_2$). Both multilayered articles showed good durability, maintaining suitable adherence and minimal oxidation.

EXAMPLE 7

Figure 8:
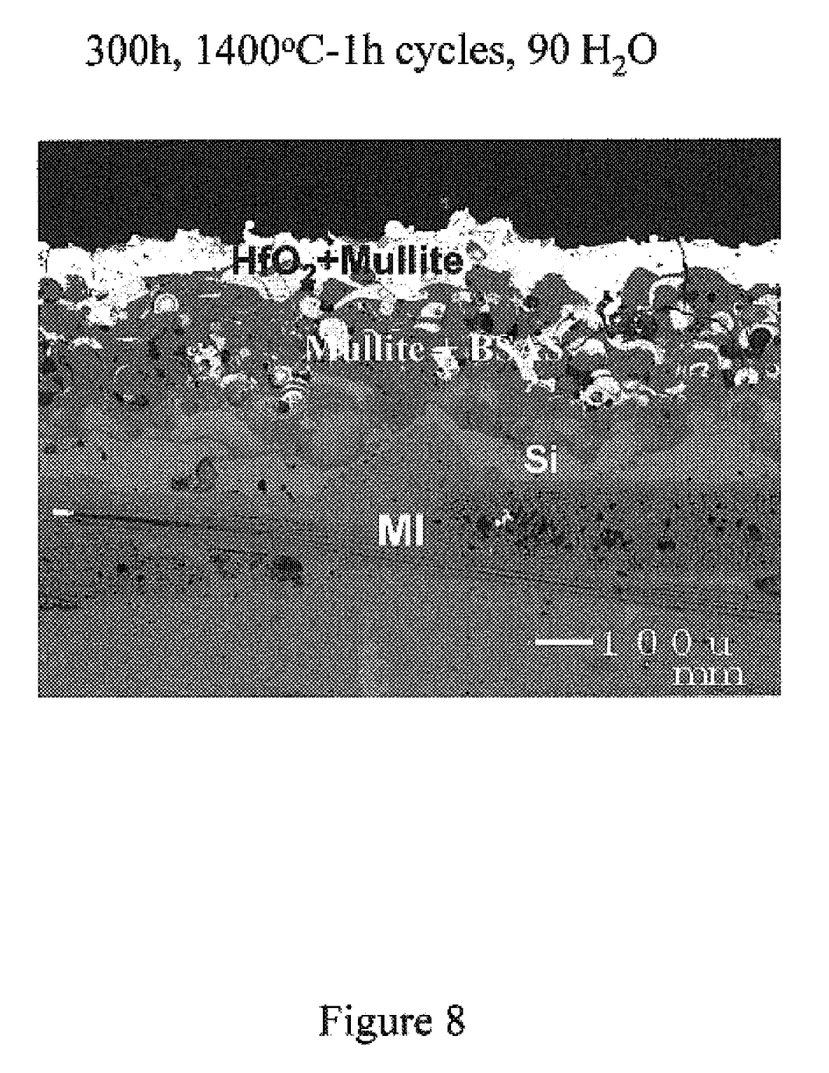
FIG. 8 shows the cross-section of an inventive article comprising a silicon bond coat, a mullite and BSAS intermediate coat and an $HfO_2$ and mullite top coat.

FIG. 8 shows the cross-section of an inventive article comprising a silicon bond coat 16, a mullite and BSAS intermediate coat 20 and an $HfD_2$ and mullite top coat 12, after the article was heated for 300 hours at 1400° C. (1 hour cycles at 90% $H_2O$-balance $O_2$). The coated article showed good durability, maintaining suitable adherence and minimal oxidation.

Although the present invention has been described with reference to the examples and with some degree of particularity in the detailed description, it should be understood that various modifications and variations can be made by those skilled in the art without departing from the spirit and scope of the invention as set forth hereafter in the appended claims.

What is claimed is:

1. A multilayer article comprising:
   a substrate comprising a compound selected from the group consisting of a ceramic compound, a Si-containing metal alloy and combinations thereof, with the proviso that said substrate excludes C/C composites;
   an outer layer; and
   at least one intermediate layer located between said outer layer and said substrate comprising a first intermediate layer and a chemical barrier layer, said chemical barrier layer being located between said first intermediate layer and said outer layer,
   wherein said outer layer comprises a rare earth silicate having a low coefficient of thermal expansion less than $8\times10-6/°$ C. and a formula selected from the group consisting of
   (a) $RE_2O_3.SiO_2$,
   (b) $2RE_2O_3.3SiO_2$,
   (c) $RE_2O_3.2SiO_2$, and combinations thereof, where RE is a rare earth element selected from the group consisting of Sc, Dy, Ho, Er, Tm, Yb, Lu, Eu, Gd, Tb and combinations thereof,
   wherein said first intermediate layer comprises a compound selected from one of (1) mullite and (2) mullite and a compound selected from the group consisting of barium strontium aluminosilicate, calcium aluminosilicate, magnesium aluminosilicate and combinations thereof, and
   wherein said chemical barrier layer comprises a compound selected from the group consisting of mullite, hafnia, hafnium silicate, scandium silicate, ytterbium silicate and combinations thereof.

2. The multilayer article of claim 1 wherein said rare earth element is selected from the group consisting of So, Er, Yb and combinations thereof.

3. The multilayer article of claim 1 wherein said rare earth silicate has the formula $RE_2O_3.SiO_2$, characterized by an X2 phase having the low coefficient of thermal expansion, where RE is selected from the group consisting of Sc, Dy, Ho, Er, Tm, Tb, Lu and combinations thereof.

4. The multilayer article of claim 1 wherein said ceramic compound is selected from the group consisting of a Si-containing compound, an oxide ceramic and combinations thereof.

5. The multilayer article of claim 4 wherein said Si-containing compound is selected from the group consisting of silicon carbide, silicon nitride, composites having a silicon carbide or silicon nitride matrix, silicon oxynitride, silicon aluminum oxynitride and combinations thereof, said oxide ceramic comprises oxide and oxide fiber/oxide matrix composites with or without silicon and said Si-containing metal alloy is selected from the group consisting of a molybdenum-silicon alloy, a niobium-silicon alloy and combinations thereof.

6. The multilayer article of claim 1 wherein said outer layer is an outermost layer of said multilayer article.

7. The multilayer article of claim 1 further comprising a mullite chemical barrier layer disposed between the at least one said intermediate layer and said substrate.

8. A component of one of a gas turbine engine, an internal combustion engine and a heat exchanger, comprised of the multilayer article of claim 1.

9. The multilayer article of claim 1 wherein said outer layer has a coefficient of thermal expansion not greater than $6\times10-6/°$ C.

10. A multilayer article comprising:
    a substrate comprising a compound selected from the group consisting of a ceramic compound, a Si-containing metal alloy and combinations thereof, with the proviso that said substrate excludes C/C composites;
    an outer layer; and
    at least one intermediate layer located between said outer layer and said substrate, wherein said outer layer comprises a rare earth silicate having a low coefficient of thermal expansion less than $8\times10-6/°$ C. and formula $RE_2O_3.—SiO_2$, where RE is a rare earth element selected from the group consisting of Sc, Dy, Ho, Er, Tm, Yb, Lu, Eu, Gd, Tb and combinations thereof,
    wherein said rare earth silicate, is characterized by an X1 phase having the low coefficient of thermal expansion, where RE is selected from the group consisting of Eu, Gd, Tb and combinations thereof.

11. A multilayer article comprising:
    a substrate comprising a compound selected from the group consisting of a ceramic compound, a Si-containing metal alloy and combinations thereof, with the proviso that said substrate excludes C/C composites;
    an outer layer; and
    at least one intermediate layer located between said outer layer and said substrate,
    wherein said outer layer comprises a rare earth silicate having a low coefficient of thermal expansion less than $8\times10-6/°$ C. and a formula selected from the group consisting of
    (a) $RE_2O_3.SiO_2$,
    (b) $2RE_2O_3.3SiO_2$,
    (c) $RE_2O_3.2SiO_2$, and combinations thereof, where RE is a rare earth element selected from the group consisting of Sc, Dy, Ho, Er, Tm, Yb, Lu, Eu, Gd, Tb and combinations thereof,
    comprising a silicon-containing layer comprising at least one of Si and a Si-containing alloy located between the at least one said intermediate layer and said substrate.

12. A multilayer article comprising:
    a substrate comprising a compound selected from the group consisting of a ceramic compound, a Si-containing metal alloy and combinations thereof;

an outer layer; and at least one intermediate layer located between said outer layer and said substrate, wherein said outer layer comprises a hafnia-containing composite oxide comprising hafnia and a compound selected from the group consisting of barium strontium aluminosilicate, calcium aluminosilicate, magnesium aluminosilicate, rare earth silicate, niobium oxide, titania and combinations thereof.

13. The multilayer article of claim 12 wherein said hafnia containing composite oxide is selected from the group consisting of $HfO_2.SiO_2$, $HfO_2.TiO_2$, $xHfO_2.Ta_2O_5$, where $5 \leq x \leq 7$, and combinations thereof.

14. The multilayer article of claim 12 wherein said hafnia-containing composite oxide comprises $HfO_2$ and a compound selected from the group consisting of barium strontium aluminosilicate, calcium aluminosilicate, magnesium aluminosilicate, rare earth silicate, $Nb_2O_5$ and combinations thereof.

15. The multilayer article of claim comprising a silicon containing layer comprising at least one of Si and a Si-containing alloy located between the at least one said intermediate layer and said substrate.

16. The multilayer article of claim 12 wherein said ceramic compound is selected from the group consisting of a Si-containing compound, an oxide ceramic and combinations thereof.

17. The multilayer article of claim 16 wherein said Si containing compound is selected from the group consisting of silicon carbide, silicon nitride, composites having a silicon carbide or silicon nitride matrix, silicon oxynitride, silicon aluminum oxynitride and combinations thereof, said oxide ceramic comprises one of oxide and oxide fiber/oxide matrix composites and said Si-containing metal alloy is selected from the group consisting of a molybdenum-silicon alloy, a niobium-silicon alloy and combinations thereof.

18. The multilayer article of claim 12 wherein said outer layer is an outermost layer of said multilayer article.

19. A component of one of a gas turbine engine, an internal combustion engine and a heat exchanger, comprised of the multilayer article of claim 12.

20. The multilayer article of claim 12 wherein said outer layer has a coefficient of thermal expansion not greater than $6 \times 10^{-6}/°C$.

21. A multilayer article comprising:

a substrate comprising a compound selected from the group consisting of a ceramic compound, a Si-containing metal alloy and combinations thereof;

an outer layer; and at least one intermediate layer located between said outer layer and said substrate, wherein the at least one said intermediate layer comprises a compound selected from one of (1) mullite and (2) mullite and a compound selected from the group consisting of barium strontium aluminosilicate, calcium aluminosilicate, magnesium aluminosilicate and combinations thereof, and wherein said outer layer comprises at least one of a) hafnia and b) a hafnia-containing composite oxide comprising hafnia and a compound selected from the group consisting of mullite, barium strontium aluminosilicate, calcium aluminosilicate, magnesium aluminosilicate, rare earth silicate, alumina, tantalum oxide, niobium oxide, silica, titania and combinations thereof.

22. A multilayer article comprising:

a Substrate comprising a compound selected from the group consisting of a ceramic compound, a Si-containing metal alloy and combinations thereof;

an outer layer, and at least one intermediate layer located between said outer layer and said substrate, wherein the at least one said intermediate layer comprises a chemical barrier layer located near said outer layer, said chemical barrier layer comprising a compound selected from the group consisting of mullite, hafnia, hafnium silicate, scandium silicate, ytterbium silicate and combinations thereof, and wherein said outer layer comprises at least one of a) hafnia and b) a hafnia-containing composite oxide comprising hafnia and a compound selected from the group consisting of mullite, barium strontium aluminosilicate, calcium aluminosilicate, magnesium aluminosilicate, rare earth silicate, alumina, tantalum oxide, niobium oxide, silica, titania and combinations thereof.

23. A multilayer article comprising:

a substrate comprising a compound selected from the group consisting of a ceramic compound, a Si-containing metal alloy and combinations thereof;

an outer layer; and at least one intermediate layer located between said outer layer and said substrate, wherein said outer layer comprises at least one of a) hafnia and b) a hafnia-containing composite oxide comprising hafnia and a compound selected from the group consisting of mullite, barium strontium aluminosilicate, calcium aluminosilicate, magnesium aluminosilicate, rare earth silicate, alumina, tantalum oxide, niobium oxide, silica, titania and combinations thereof, and further comprising a mullite chemical barrier layer disposed between the at least one said intermediate layer and said substrate.

24. A multilayer article comprising:

a substrate comprising a compound selected from the group consisting of a ceramic compound, a Si-containing metal alloy and combinations thereof;

an outer layer comprising: a zirconia-containing oxide comprising zirconia and a compound selected from the group consisting of silica, titania, tantalum oxide and combinations thereof; and at least one intermediate layer located between said outer layer and said substrate, wherein the at least one said intermediate layer comprises a compound selected from one of (1) mullite and (2) mullite and a compound selected from the group consisting of barium strontium aluminosilicate, calcium aluminosilicate, magnesium aluminosilicate and combinations thereof.

25. A multilayer article comprising:

a substrate comprising a compound selected from the group consisting of a ceramic compound, a Si-containing metal alloy and combinations thereof;

an outer layer comprising: a zirconia-containing oxide comprising zirconia and a compound selected from the group consisting of silica, titania, tantalum oxide and combinations thereof; and at least one intermediate layer located between said outer layer and said substrate, wherein the at least one said intermediate layer comprises a chemical barrier layer located near said outer layer, said chemical barrier layer comprising a compound selected from the group consisting of mullite, hafnia, hafnium silicate, scandium silicate, ytterbium silicate and combinations thereof.

26. A multilayer article comprising:

a substrate comprising a compound selected from the group consisting of a ceramic compound, a Si-containing metal alloy and combinations thereof;

an outer layer; and at least one intermediate layer located between said outer layer and said substrate, wherein said outer layer comprises a zirconia-containing oxide comprising zirconia and a compound selected from the group consisting of silica, titania, tantalum oxide and combinations thereof, wherein said outer layer has a coefficient of thermal expansion of not greater than $6 \times 10^{-6}/°$ C. and said outer layer and said intermediate layer are effective to inhibit penetration of water vapor to said substrate at a temperature of at least 1300° C., and a mullite chemical barrier layer disposed between the at least one said intermediate layer and said substrate.

27. A multilayer article comprising:

a substrate comprising a compound selected from the group consisting of a ceramic compound, a Si-containing metal alloy and combinations thereof;

an outer layer; and at least one intermediate layer located between said outer layer and said substrate, wherein said outer layer consists of a zirconia-containing oxide comprising zirconia and a compound selected from the group consisting of silica, titania, tantalum oxide and combinations thereof.

28. A multilayer article comprising:

a substrate comprising a compound selected from the group consisting of a ceramic compound, a Si-containing metal alloy and combinations thereof;

an outer layer comprising: a zirconia-containing oxide comprising zirconia and a compound selected from the group consisting of silica, titania, tantalum oxide and combinations thereof; and at least one intermediate layer located between said outer layer and said substrate, wherein the at least one said Intermediate layer comprises:

a compound selected from one of (1) mullite and (2) mullite and a compound selected from the group consisting of barium strontium aluminosilicate, calcium aluminosilicate, magnesium aluminosilicate and combinations thereof; and a chemical barrier layer located near said outer layer, said chemical barrier layer comprising a compound selected from the group consisting of mullite, hafnia, hafnium silicate, scandium silicate, ytterbium silicate and combinations thereof.

* * * * *